United States Patent
Nordstrom et al.

[15] 3,650,811

[45] Mar. 21, 1972

[54] ACRYLIC-SILOXANE RESIN PAINT IV

[72] Inventors: John D. Nordstrom, Detroit; Carolyn B. Zelek, Ypsilanti, both of Mich.

[73] Assignee: Ford Motor Company, Dearborn, Mich.

[22] Filed: Dec. 24, 1969

[21] Appl. No.: 888,055

[52] U.S. Cl..................117/93.31, 117/124 F, 117/132 BS, 117/138.8 A, 117/148, 117/161 ZA, 204/159.13, 260/827

[51] Int. Cl............................................................B44d 1/50

[58] Field of Search..................117/93.31, 161 ZA, 132 BS, 117/124 F, 138.8 A, 121, 148; 204/159.13, 159.16; 260/46.5 Y, 827

[56] References Cited

UNITED STATES PATENTS

| | | | |
|---|---|---|---|
| 3,075,941 | 1/1963 | Wynstra et al. | 117/132 BS |
| 3,437,512 | 4/1969 | Burlant et al. | 117/93.31 |
| 3,536,779 | 10/1970 | Bedikian et al. | 117/161 ZA |

*Primary Examiner*—Ralph S. Kendall
*Assistant Examiner*—J. H. Newsome
*Attorney*—John Faulkner and Olin B. Johnson

[57] ABSTRACT

A novel acrylic-siloxane paint binder resin that is crosslinkable with vinyl monomers by exposure to an electron beam is produced in a three step reaction wherein (1) a siloxane having two or more hydroxy or alkoxy functional groups per molecule is reacted with a $C_5$–$C_{12}$ monohydroxy acrylate, i.e., the monohydroxy ester of a $C_2$–$C_8$ diol and acrylic or methacrylic acid, (2) the siloxane-acrylate product of the first reaction step is reacted with a mixture of vinyl monomers having as a constituent monomer an acrylate selected from glycidyl acrylate and glycidyl methacrylate, and (3) the resultant siloxane-acrylate-vinyl monomer copolymer is reacted with acrylic or methacrylic acid.

17 Claims, No Drawings

ACRYLIC-SILOXANE RESIN PAINT IV

BACKGROUND OF THE INVENTION

Electron-curable, siloxane-modified polyester paints have been disclosed by W. J. Burlant and I. H. Tsou in the U.S. Pat. Nos. 3,437,512 and 3,437,513. In one embodiment, they produce this resin by reacting a hydroxy or hydrocarbonoxy functional siloxane with a diol and then reacting the siloxane-comprising product with two different anhydrides, one of these being an alpha-beta olefinically unsaturated compound, e.g., maleic anhydride, which introduces the desired amount of alpha-beta olefinic unsaturation into the resin. In another embodiment, they produce the resin by reacting a hydroxylated polyester with a hydroxy or hydrocarbonoxy siloxane.

Electron-curable, siloxane-acrylate reaction products are disclosed in copending U.S. Pat. application Ser. No. 776,779 filed Nov. 18, 1968 by John D. Nordstrom, co-inventor herein. These materials are formed by reacting one molar part hydroxy functional or hydrocarbonoxy functional siloxane with, preferably at least two molar parts of, a hydroxyl bearing ester of an alpha-beta, olefinically, unsaturated carboxylic acid.

It is one object of this invention to provide siloxane-comprising acrylic paints curable by electron-beam radiation which exhibit improved adhesion to the substrate upon which they are cured.

It is another object of this invention to provide siloxane-comprising acrylic paints curable by electron-beam radiation which offer improved weatherability and are more easily cured.

THE INVENTION

It has been discovered that improved adhesion, weatherability, curability, and flexibility of paint film is obtained in an electron-beam cured coating comprising in combination vinyl monomers and a novel alpha-beta olefinically unsaturated acrylic-siloxane resin hereinafter described in detail. Thus, this invention relates to painted articles of manufacture wherein the painted surface has high resistance to weathering, with the process of producing such painted surfaces, with the paint used in such process, and with a method for manufacturing the novel paint binder resins used in said paint. In particular, this invention is concerned with the painting of substrates of wood, metal, glass, polymeric solids and fabrics of synthetic or natural fibers and the curing of the novel paints thereon.

The novel acrylic-siloxane paint binder resin that is used herein is formed by a three step reaction wherein (1) a siloxane having two or more hydroxy or alkoxy functional groups per molecule is reacted with a $C_5$–$C_{12}$ monohydroxy acrylate, i.e., the monohydroxy ester of a $C_2$–$C_8$ diol and acrylic or methacrylic acid, (2) the siloxane-acrylate product of the first reaction step is reacted with a mixture of vinyl monomers having as a constituent monomer an acrylate selected from glycidyl acrylate and glycidyl methacrylate, and (3) the resultant siloxane-acrylate-vinyl monomer copolymer is reacted with acrylic or methacrylic acid.

In this application, the term "paint" is meant to include pigment and/or finely ground filler, the binder without pigment and/or filler or having very little of the same, which can be tinted if desired. Thus, the binder which is ultimately converted to a durable film resistant to weathering can be all or virtually all that is used to form the film, or it can be a vehicle for pigment and/or particulate filler material.

The siloxanes employed in the preparation of the binder have a reactive hydroxyl or a $C_1$ to $C_4$, preferably $C_1$–$C_2$, alkoxy group bonded to at least two of its silicon atoms. The term "siloxane" as employed herein refers to a compound containing a

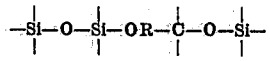

linkage, with the remaining valences being satisfied by a hydrocarbon radical, a hydrocarbonoxy radical, hydrogen, a hydroxyl group, or an oxygen atom which interconnects the silicon atom providing such valence with another silicon atom. The siloxane may be either cyclic or acyclic. Suitable cyclic and acyclic siloxanes for use in this invention are described and illustrated in detail in the aforementioned patents to W. J. Burlant and I. H. Tsou. The preferred siloxanes contain 2 to 5 hydroxy and/or alkoxy functional groups. The choice of reactants is advantageously arranged so that the siloxane comprises about 10 to about 50 weight percent of the binder resin produced in the three step reaction process.

The hydroxy acrylates used in the first reaction step are $C_5$–$C_{12}$ esters of a $C_2$–$C_8$ dihydric alcohol and acrylic or methacrylic acid. These include 2-hydroxyethyl acrylate and methacrylate, 2-hydroxypropyl acrylate and methacrylate, 2-hydroxybutyl acrylate and methacrylate, 2-hydroxyoctyl acrylate and methacrylate, etc. A sufficient quantity of the hydroxy acrylate is used in the first reaction step to react with at least two of the functional groups on the molecules of siloxane employed. In the preferred embodiment, the quantity of hydroxy acrylate is sufficient to react with all of the functional groups of the siloxane.

The vinyl monomers used in the second reaction step include as one of the constituent monomers an acrylate selected from glycidyl acrylate and glycidyl methacrylate. The glycidyl compound is a minor proportion, advantageously about 10 to 45 weight percent of this monomer mix. The major proportion by weight of these monomers is a mixture of acrylates selected from esters of $C_1$–$C_8$ monohydroxy alcohols and acrylic or methacrylic acid. These include methyl methacrylate, ethyl acrylate, propyl acrylate, butyl acrylate, butyl methacrylate, 2-ethyl hexyl acrylate, etc. This vinyl monomer mix may include a minor proportion of vinyl hydrocarbons, e.g., styrene and alkylated styrenes such as vinyl toluene, alpha-methyl styrenes, etc. One may also use a minor proportion of other vinyl monomers such as acrylonitrile, acrylamide, methacrylonitrile, vinyl halides, e.g., vinyl chloride, and vinyl carboxylates, e.g., vinyl acetate.

The acrylic or methacrylic acid used in the third reaction step is isued in amount sufficient to react with substantial amount, preferably all of the glycidyl molecules in the resin.

The acrylic-siloxane resin thus produced is admixed with $C_5$–$C_{12}$ vinyl monomers to form a paint binder solution which is applied by conventional means, e.g., spraying, roll coating, etc., to a substrate and polymerized thereon by ionizing radiation, preferably in the form of an electron beam having average energy in the range of about 100,000 to about 500,000 electron volts.

The vinyl monomers in which the acrylic-siloxane resin is dissolved to form the paint binder solution are preferably a mixture of acrylates selected from esters of $C_1$–$C_8$ monohydric alcohols and acrylic or methacrylic acid such as those above named. Vinyl hydrocarbons can be used alone but are preferably employed in minor proportion with a major proportion of acrylates. Other acrylates such as the hydroxy acrylates and methacrylates and di-, tri-, and tetrafunctional acrylates can be used in minor proportion. Also, in combination with the acrylates and/or vinyl hydrocarbons there can be used minor amounts of other vinyl monomers such as acrylonitrile, acrylamide, methacrylonitrile, vinyl halides, e.g., vinyl chloride, and vinyl carboxylates, e.g., vinyl acetate.

In preparing the paints of this invention, the alpha-beta olefinically unsaturated resin component may comprise up to about 80 weight percent of the paint binder solution on a pigment and particulate filler free basis and as low as about 20 weight percent. Preferably, the resin comprises about 35 to about 65 weight percent of the resin-monomer solution with the vinyl monomers comprising about 65 to about 35 weight percent of the same. It will be understood that other alpha-beta olefinically unsaturated polymers may be substituted for a minor portion of the acrylic-siloxane resin of this invention.

The abbreviation "Mrad" as employed herein means 1,000,000 rad. The term "rad" as employed herein means that dose of radiation which results in the absorption of 100 ergs of energy per gram of absorber, e.g., coating film. The electron emitting means may be a linear electron accelerator capable of producing a direct current potential in the range hereinbefore set forth. In such a device, electrons are ordinarily emitted from a hot filament and accelerated through a uniform voltage gradient. The electron beam, which may is about ⅛ inch diameter at this point, is then scanned in one direction to make a fan-shaped beam and then passed through a metal window, e.g., aluminum, aluminum alloyed with a small amount of copper, a magnesium-thorium alloy, etc., of about 0.003 inch thickness.

The binder is preferably applied to the substrate and cured thereon as a continuous film of substantially even depth, preferably a depth in the range of about 0.1 to about 4.0 mils depending upon the substrate and the intended end use of the coated product. The film-forming binder solution should have a viscosity low enough to permit rapid application to the substrate in substantially even depth and, preferably, high enough so that a 1 mil. (0.001 inch) film will hold upon a vertical surface without sagging. The viscosity of the binder is adjusted by varying the molecular weight of the resin or resins and/or by varying the relative concentrations of the resin component and/or by varying the relative concentrations of the resin component and/or by varying the relative concentrations of dissimilar monomers within the vinyl monomer component. The binder is preferably applied to the substrate essentially free of nonpolymerizable organic solvents and/or diluents but it is within the scope of this invention to employ such solvents and diluents and to flash off the same prior to curing. The acrylic-siloxane resins advantageously have average molecular weights above about 2,500 and below about 50,000, preferably in the range of about 5,000 to about 25,000.

This invention will be more fully understood from the following illustrative examples:

EXAMPLE 1

An acrylic-siloxane paint binder resin is prepared in the following manner:

1. First Step Reaction—Siloxane with Hydroxy Acrylate

| Reactants & Aids | Parts by Weight |
| --- | --- |
| Siloxane (1) | 206 |
| Hydroxyethyl Acrylate | 40 |
| Tetraisopropyl Titanate | 0.4 |
| Hydroquinone | 0.1 |

(1) an acyclic polysiloxane having molecular weight in the range of 700 to 800 with an average of 3–4 methoxy functional groups per molecule.

Procedure

The reactants are heated to 100° C. and from 100° C. to 150° C. over a 2-hour period and 11 parts by weight methanol distillate are removed via a Barrett distillation receiver.

2. Second Step Reaction—Siloxane-Acrylate with Vinyl Monomers

| Reactants & Aids | Parts by Weight |
| --- | --- |
| Siloxane-Acrylate of (1) | 100 |
| Ethyl Acrylate | 30 |
| Methyl Methacrylate | 32 |
| Glycidyl Methacrylate | 46 |
| Azobisisobutyronitrile | 5 |
| Xylene | 490 |

The reactants and catalysts are added to refluxing xylene, evenly, over a 2-hour period. The resultant solution is allowed to reflux for 6 hours.

3. Third Step Reaction — Acrylic Acid with Product of Second Step Reaction

To the refluxing solution of xylene and the product of the second step reaction is added 26 parts by weight methacrylic acid, 0.1 part by weight hydroquinone, and 0.5 parts by weight tetraethyl ammonium chloride. Heating is continued until the acid content drops to about 0.053 milliequivalents per gram. The resin is recovered from the xylene and dissolved in 100 parts by weight methyl methacrylate.

A film of the solution is applied to a metal substrate to an average depth of about 1 mil (0.001 inch) and cross-linked by exposure to an 8-Mrad dose of energy from a 270 kilovolt, 25 milliampere electron beam in a nitrogen atmosphere.

EXAMPLE 2

The procedure of Example 1 is repeated except for the differences that the electron beam has average energy of 325 kilovolts and films having average thickness of 0.2, 0.5, 1.5, 2.5 and 4 mils are irradiated.

EXAMPLE 3

The procedure of Example 1 is repeated except for the differences that the substrate is wood and the vinyl monomer component of the paint binder solution is a mixture of 2 molar parts methyl methacrylate and 1 molar part styrene.

EXAMPLE 4

The procedure of Example 1 is repeated except for the differences that the substrate is a synthetic polymeric solid, i.e., acrylonitrile-butadiene-styrene copolymer, and the vinyl monomer component of the paint binder solution consists of 2 molar parts methyl methacrylate, 2 molar parts ethyl acrylate, 1 molar part vinyl toluene and ½ molar part 2-ethylhexyl acrylate.

EXAMPLE 5

The procedure of Example 1 is repeated except for the differences that the substrate is glass, the vinyl monomer component of the paint binder solution consists of 1 molar part butyl acrylate, 1 molar part ethyl acrylate and 2 molar parts styrene, and the paint binder solution is pigmented with particulate titanium dioxide.

EXAMPLE 6

The procedure of Example 1 is repeated except for the differences that the substrate is cotton fabric, the acrylic-siloxane resin component comprises 20 weight percent of the film-forming solution and the vinyl monomer component is an equimolar mixture of methyl methacrylate, ethyl acrylate and 2-ethylhexyl acrylate.

EXAMPLE 7

The procedure of Example 1 is repeated except for the differences that the film-forming solution consists of 80 parts by weight of the acrylic-siloxane resin and 20 parts by weight methyl methacrylate and an equimolar amount of glycidyl acrylate is substituted for the glycidyl methacrylate in the second reaction step of resin preparation.

EXAMPLE 8

The procedure of Example 1 is repeated except that the methoxy functional acyclic siloxane is replaced with a hydroxy functional cyclic siloxane (Dow Corning Z–6018) having the following properties:

| | |
| --- | --- |
| Hydroxy content, Dean Stark: | |
| Percent condensable | 5.5 |
| Percent free | 0.5 |
| Average molecular weight | 1,600 |
| Combining weight | 400 |
| Refractive index | 1.531–1.539 |

| | |
|---|---|
| Softening point, Durran's Mercury method, °F. | 200 |
| At 60% solids in xylene Specific gravity at 77° F. | 1.075 |
| Viscosity at 77° F., centipoises | 33 |
| Gardner - Holdt | A-1 |

A functionally equivalent amount of this siloxane is substituted for the siloxane of Example 1.

EXAMPLE 9

The procedure of Example 1 is repeated except for the differences that hydroxyethyl methacrylate is substituted for the hydroxyethyl acrylate in the first reaction step and the paint binder solution comprises 65 weight percent resin and 35 parts by weight methyl methacrylate.

EXAMPLE 10

The procedure of Example 1 is repeated except for the differences that hydroxyoctyl acrylate is substituted for the hydroxyethyl acrylate in the first reaction step and the paint binder solution comprises 35 parts by weight resin and 65 parts by weight of a vinyl monomer mixture of 2 molar parts methyl methacrylate, 1 molar part ethyl acrylate and 1 molar part butyl methacrylate.

EXAMPLE 11

The procedure of Example 1 is repeated except for the difference that the vinyl monomer component of the paint binder solution consists of 3 molar parts methyl methacrylate, ¼ molar part vinyl chloride, ¼ molar part vinyl acetate and 1 molar part styrene.

EXAMPLE 12

The procedure of Example 1 is repeated except for the difference that the vinyl monomer component of the paint binder solution consists of 3 molar parts methyl methacrylate, ½ molar part acrylonitrile, ½ molar part styrene and ½ molar part divinyl benzene.

EXAMPLE 13

The procedure of Example 1 is repeated except for the difference that the vinyl monomer component of the paint binder solution consists of 3 molar parts styrene and 1 molar part divinyl benzene.

EXAMPLE 14

The procedure of Example 1 is repeated except for the difference that an equimolar amount of methacrylic acid is substituted for the acrylic acid in the third step reaction in the preparation of the acrylic-siloxane resin.

It will be understood by those skilled in the art that changes can be made in the foregoing examples without departing from the spirit and scope of this invention as expressed in the appended claims.

We claim:

1. An article of manufacture comprising a substrate and an adherent coating of paint on an external surface thereof, said coating comprising the in situ formed polymerization product of a film-forming solution of 20 to 80 parts by weight vinyl monomers and 80 to 20 parts by weight of an alpha-beta olefinically unsaturated acrylic-siloxane resin applied to said surface as a paint film and cross-linked thereon by exposing said film to ionizing radiation, said acrylic-siloxane resin being formed by (1) reacting by etherification a siloxane having at least two functional groups with a hydroxy acrylate selected from the monohydroxy esters of $C_2$–$C_8$ dihydric alcohols and acrylic or methacrylic acid, (2) reacting by vinyl addition the resultant siloxane-acrylate with a mixture of vinyl monomers at least one constituent monomer of which is selected from glycidyl acrylate and glycidyl methacrylate and (3) reacting by esterification the resultant siloxane comprising resin with acrylic or methacrylic acid.

2. An article of manufacture in accordance with claim 1 wherein said siloxane comprises about 10 to about 50 weight percent of said acrylic-siloxane resin.

3. An article of manufacture in accordance with claim 1 wherein said film-forming solution consists essentially of 35 to 65 parts by weight of said acrylic-siloxane resin and 65 to 35 parts by weight of vinyl monomers.

4. An article of manufacture in accordance with claim 1 wherein said substrate is metal.

5. An article of manufacture in accordance with claim 1 wherein said substrate is wood.

6. An article of manufacture in accordance with claim 1 wherein said substrate is a synthetic polymeric solid.

7. An article of manufacture in accordance with claim 1 wherein said substrate is glass.

8. An article of manufacture in accordance with claim 1 wherein said substrate is fabric.

9. An article of manufacture in accordance with claim 1 wherein said siloxane contains an average of two to five of said functional groups per molecule.

10. A paint comprising particulate pigment and a film-forming solution consisting essentially of 20 to 80 parts by weight vinyl monomers 80 to 20 parts by weight of an acrylic-siloxane resin formed by (1) reacting by etherification a siloxane having at least two functional groups selected from hydroxyl groups and alkoxy groups with a a hydroxy acrylate selected from the monohydroxy esters of $C_2$–$C_8$ dihydric alcohols and acrylic or methacrylic acid, (2) reacting by vinyl addition the resultant siloxane-acrylate with a mixture of vinyl monomers having as a constituent monomer an acrylate selected from glycidyl acrylate and glycidyl methacrylate, and (3) reacting by esterification the resultant siloxane-comprising resin with acrylic or methacrylic acid.

11. A paint in accordance with claim 10 wherein said functional groups are hydroxyl groups and said siloxane contains two to five of said groups per molecule.

12. A paint in accordance with claim 10 wherein said functional groups are methoxy groups and said siloxane contains two to five of said groups per molecule.

13. A paint in accordance with claim 10 wherein said film-forming solution consists essentially of 35 to 65 parts by weight vinyl monomers and 65 to 35 parts by weight of said acrylic-siloxane resin.

14. A paint in accordance with claim 10 wherein said vinyl monomers consists essentially of esters of acrylic or methacrylic acid and a $C_1$–$C_8$ monohydric alcohol.

15. A paint in accordance with claim 10 wherein said vinyl monomers consists essentially of a mixture of $C_8$–$C_{10}$ vinyl hydrocarbons and esters of acrylic or methacrylic acid and a $C_1$–$C_8$ monohydric alcohol.

16. A method for coating a substrate which comprises applying to the surface of said substrate to an average depth in the range of about 0.1 to about 4 mils a film-forming solution consisting essentially of 20 to 80 parts by weight vinyl monomers and 80 to 20 parts by weight of an acrylic-siloxane resin and cross-linking said vinyl monomers and said resin upon said surface by exposing said coating to an electron beam having average energy in the range of about 100,000 to about 500,000 electron volts, said acrylic-siloxane resin being formed by (1) reacting by etherification a siloxane having at least two functional groups selected from hydroxyl groups and alkoxy groups with a hydroxy acrylate selected from the monohydroxy esters of $C_2$–$C_8$ dihydric alcohols and acrylic or methacrylic acid, (2) reacting by vinyl addition the resultant siloxane-acrylate with a mixture of vinyl monomers having as a constituent monomer an acrylate selected from glycidyl acrylate and glycidyl methacrylate, and (3) reacting by esterification the resultant siloxane-comprising resin with acrylic acid or methacrylic acid.

17. An acrylic-siloxane resin formed by 1. reacting by etherification a siloxane having at least two functional groups selected from hydroxyl groups and alkoxy groups with a hydroxy acrylate selected from the monohydroxy esters of $C_2$–$C_8$ dihydric alcohols and acrylic or methacrylic acid,
2. reacting by vinyl addition the resultant siloxane-acrylate with a mixture of vinyl monomers having as a constituent monomer an acrylate selected from glycidyl acrylate and glycidyl methacrylate and
3. reacting by esterification the resultant siloxane-comprising resin with acrylic or methacrylic acid.

\* \* \* \* \*